(12) United States Patent
Akiyama et al.

(10) Patent No.: US 7,319,480 B2
(45) Date of Patent: Jan. 15, 2008

(54) METHOD AND APPARATUS FOR COMPRESSING MOTION IMAGE FILES TO PROVIDE AN IMPROVED IMAGE NAVIGATION DISPLAY

(75) Inventors: Hideki Akiyama, Fujisawa (JP); Taichi Okabayashi, Shinjuku-ku (JP)

(73) Assignee: Eastman Kodak Company, Rochester, NY (US)

( * ) Notice: Subject to any disclaimer, the term of this patent is extended or adjusted under 35 U.S.C. 154(b) by 699 days.

(21) Appl. No.: 10/606,869

(22) Filed: Jun. 26, 2003

(65) Prior Publication Data

US 2004/0264789 A1     Dec. 30, 2004

(51) Int. Cl.
- H04N 5/225    (2006.01)
- H04N 7/26     (2006.01)
- H04N 7/12     (2006.01)
- H04N 11/02    (2006.01)
- H04N 11/04    (2006.01)
- H04B 1/66     (2006.01)

(52) U.S. Cl. .............. 348/220.1; 386/111; 375/240.16; 348/333.05; 348/231.2

(58) Field of Classification Search ........... 348/231.99, 348/220.1, 333.05, 333.01, 333.02, 231.2; 382/239, 236, 238, 251; 386/109, 111; 375/240–241
See application file for complete search history.

(56) References Cited

U.S. PATENT DOCUMENTS

| | | | |
|---|---|---|---|
| 5,164,831 A | | 11/1992 | Kuchta et al. |
| 6,018,362 A | * | 1/2000 | Suzuki et al. ............ 348/220.1 |
| 6,937,273 B1 | * | 8/2005 | Loui ....................... 348/220.1 |
| 6,992,707 B2 | * | 1/2006 | Obrador ................. 348/220.1 |
| 2002/0003576 A1 | * | 1/2002 | Konishi et al. ............. 348/232 |

OTHER PUBLICATIONS

*CompactFlash Specification Version 1.3*, published by the CompactFlash Association, Palo Alto, California, Aug. 5, 1998.

"Digital Still Camera Image File Format (Exif)" version 2.1, Jul. 1998 by the Japan Electronics Industries Development Association (JEIDA), Tokyo, Japan.

* cited by examiner

*Primary Examiner*—Ngoc-Yen Vu
*Assistant Examiner*—Gregory V Madden
(74) *Attorney, Agent, or Firm*—Thomas J. Strouse

(57) ABSTRACT

A method for producing a motion video image file from a motion image sequence, includes the steps of providing a first target data rate for a first image frame of the motion image sequence; compressing the first image frame using the first target data rate, and storing the compressed first image frame in a motion video image file; providing a second target data rate for subsequent image frames of the motion video sequence, the second target data rate being lower than the first target data rate; and compressing the subsequent image frames of the motion image sequence using the second target data rate. The method further includes the steps of storing the compressed subsequent image frames in the motion video image file; decompressing the compressed first image frame; and using the decompressed first image frame to provide a still image representative of the motion video image file.

17 Claims, 6 Drawing Sheets

METHOD AND APPARATUS FOR COMPRESSING MOTION IMAGE FILES TO PROVIDE AN IMPROVED IMAGE NAVIGATION DISPLAY

FIELD OF THE INVENTION

The invention relates generally to the field of digital video compression, and in particular, to a compression method which uses a higher target data rate for a first video frame to provide an improved image navigation display.

BACKGROUND OF THE INVENTION

Currently, consumer digital cameras are available which capture both still digital images and motion video images. The images are compressed by the digital camera and stored as still image files and motion video files using a digital memory, such as a Flash EPROM memory card. The image files are then transferred to a computer where they can be viewed, archived, or sent to others via email.

To select images, software application programs on the computer normally provide a "navigation" display, such as a user interface display screen having many small "thumbnail" images arranged in rows and columns, where each thumbnail represents an image file. For still images, a reduced size version of the still image is used as the thumbnail. For video files, it is normal to use the first image of the video sequence to represent the video file. Once the user selects the thumbnail for a video file, they can select a control icon which plays the video file as a motion sequence on the computer monitor.

Because the motion video sequence is normally more highly compressed than the still image thumbnail, the first frame of the video sequence in the navigation display can have a poorer image quality than the still image thumbnail. This makes the display less attractive. If the target data rate used to produce the compressed motion video file is made higher, the quality of the first frame, and all other frames, will be increased. However, the size of the compressed video file will also be greatly increased, thus reducing the number of images that can be stored in the digital memory.

SUMMARY OF THE INVENTION

Accordingly, it is an object of the present invention to provide a high quality image navigation display for representing motion video sequences which does not significantly increase the size of the compressed video file.

This object is achieved by a method for producing a motion video image file from a motion image sequence, comprising the steps of:
 a) providing a first target data rate for a first image frame of the motion image sequence;
 b) compressing the first image frame using the first target data rate, and storing the compressed first image frame in a motion video image file;
 c) providing a second target data rate for subsequent image frames of the motion video sequence, the second target data rate being lower than the first target data rate;
 d) compressing the subsequent image frames of the motion image sequence using the second target data rate;
 e) storing the compressed subsequent image frames in the motion video image file;
 f) decompressing the compressed first image frame; and
 g) using the decompressed first image frame to provide a still image representative of the motion video image file.

The present invention provides an improved image navigation display from a compressed video file. Another advantage of this invention is that it is compatible with currently available software programs which use the first frame of a compressed video file as the navigation image.

DETAILED DESCRIPTION OF THE INVENTION

Figure 1:
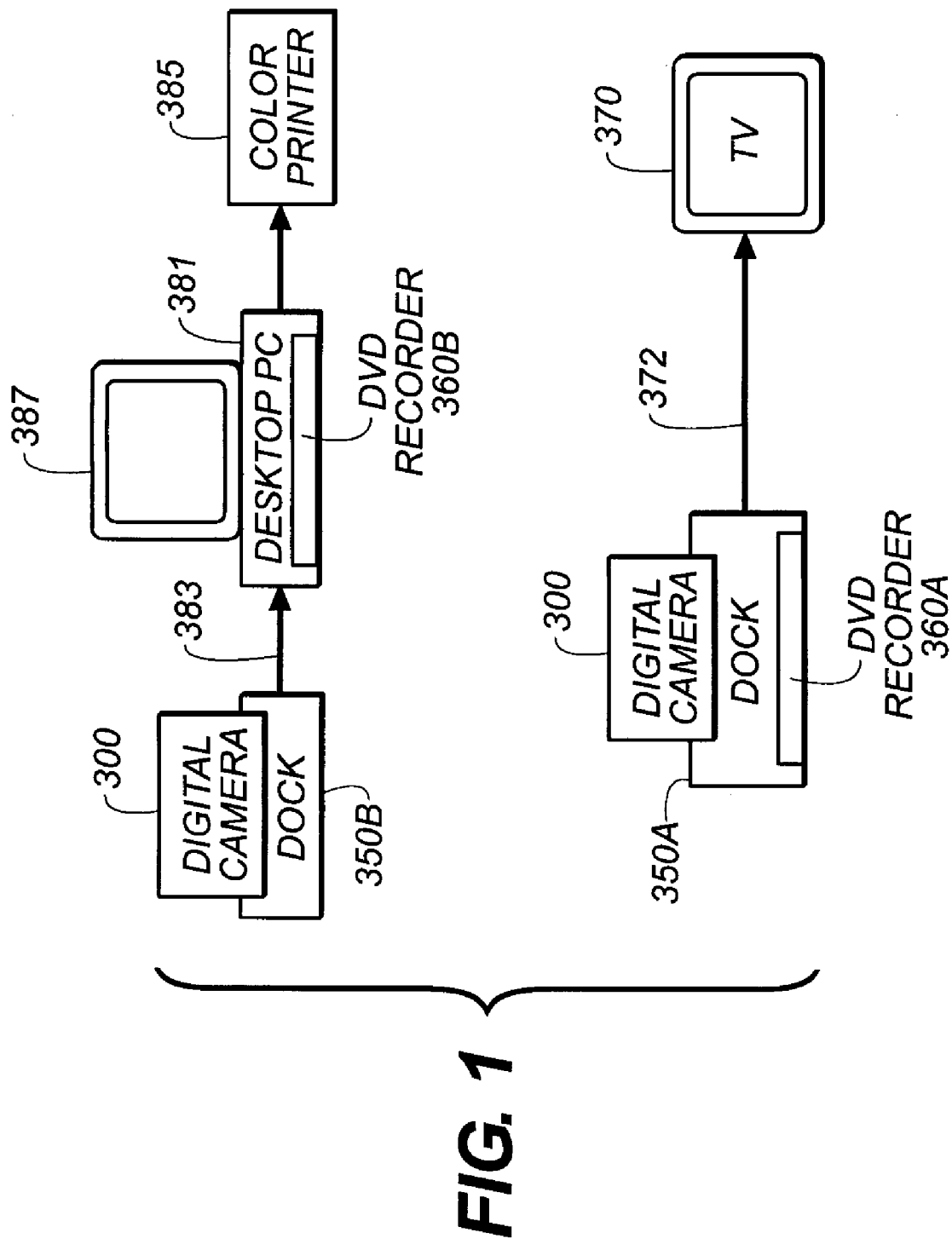
FIG. 1 is a block of a motion/still imaging system according to the present invention.

FIG. 1 is a block of a motion/still imaging system according to the present invention. A digital camera 300 is capable of capturing motion video images and still images. The camera 300 connects to a computer docking unit 350B or a TV docking unit 350A.

The computer docking unit 350B attaches to a desktop personal computer (PC) 381 via a suitable digital interface 383, which can be, for example the well-known USB cable interface. A DVD recorder 360B can be part of the desktop PC 381, and can store the motion video images and still images transferred from the digital camera 300. The desktop PC 381 includes a display monitor 387, as well as internal Random Access Memory (RAM) (not shown) and a magnetic hard drive memory (not shown). The desktop PC 381 can optionally be connected to other peripherals, such as a color printer 385.

The TV docking unit 350A recharges the camera batteries and enables the motion and still image files to be displayed on a TV monitor or receiver 370. The files can also be stored onto an optical disc using DVD recorder 360A. The connection to the TV monitor or receiver 370 is made using a standard video interface 372, which can be, for example, an analog composite video and audio cable or a component digital video interface.

Figure 2:
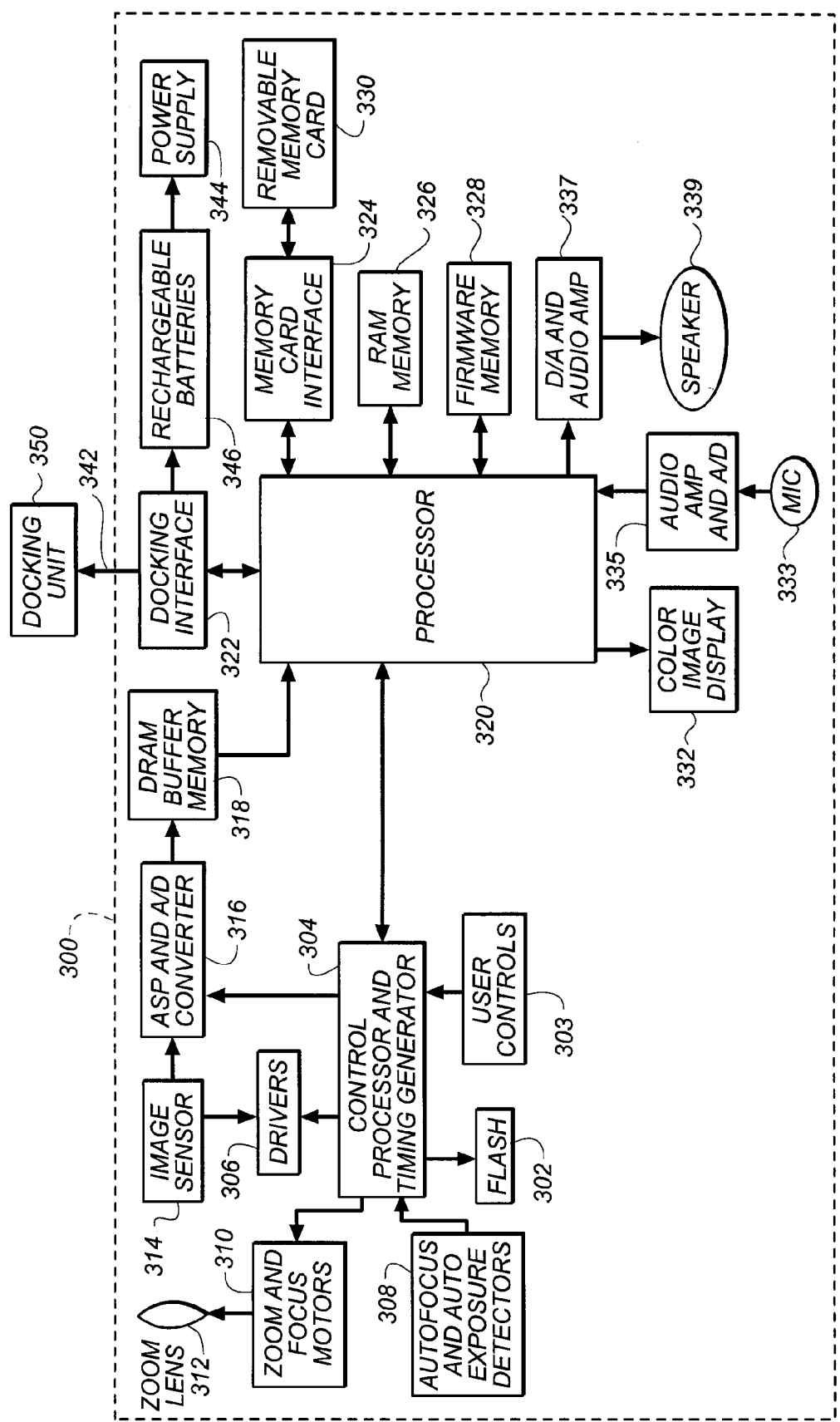
FIG. 2 is a block diagram of a digital motion/still camera.

FIG. 2 is a block diagram showing the digital camera 300 in more detail. Electrical power for all of the circuits of the digital camera 300 is provided by rechargeable batteries 346 via power supply 344. The rechargeable batteries 346 are recharged via power supplied by a docking unit 350 to a docking interface 322. The digital camera 300 produces digital still images and digital motion video images that are stored on a removable memory card 330. The digital camera 300 includes a zoom lens 312 having zoom and focus motor drives 310 and an adjustable aperture and shutter (not shown). The zoom lens 312 focuses light from a scene (not shown) to provide an optical image focused on an image sensor 314, for example, a single-chip color CMOS or CCD image sensor, using the well-known Bayer color filter pattern. The image sensor 314 is controlled by clock drivers 306. The zoom and focus motors 310 and the clock drivers 306 are controlled by control signals supplied by a control processor and timing generator circuit 304.

The control processor and timing generator circuit 304 receives inputs from autofocus and autoexposure detectors 308 and controls a flash 302. The analog image signal from the image sensor 314 is amplified and converted to digital data by an analog signal processing (ASP) and analog-to-digital (A/D) converter circuit 316. The digital image data from the ASP and A/D converter circuit 316 is temporarily stored in a DRAM buffer memory 318 and subsequently processed by a processor 320 controlled by firmware stored in firmware memory 328, which can be flash EPROM memory. It will be understood that if the image sensor 314 is a CMOS sensor, the integrated circuit containing the image sensor 314 can also include other circuitry, such as the control processor and timing generator circuit 304, the clock drivers 306, and the ASP and A/D converter circuit 316.

It will be understood that the still images can be captured using a relatively higher resolution (e.g., 1800×1200 pixels) and digital motion images can be captured using a relatively lower resolution (e.g., 640×480 pixels). The still and motion images can use different image aspect ratios (e.g., 3:2 for still images and 4:3 for motion images) or can use the same image aspect ratio (e.g., 4:3 for both still and motion images).

A color image display 332 provides a viewfinder display, and can use an LCD display, an OLED display, or other types of display technologies. The digital camera 300 is controlled by user controls 303, which include a mode control (not shown) for selecting between a still image capture mode, a motion video capture mode, and an image review mode. The user controls 303 also include a shutter button (not shown) for initiating capture of a still image. The shutter button is also momentarily pressed to first begin, and then to end, the capture of a motion image sequence. The graphical user interface displayed on the color image display 332 is controlled by the user interface portion of the firmware stored in the firmware memory 328.

The camera user interface also includes a microphone 333, which connects to an audio amplifier and A/D converter 335, to provide a digital audio signal to the processor 320. The camera user interface can also include a digital-to-analog (D/A) converter and audio amplifier 337, and a miniature speaker 339, which plays back the recorded audio, and also makes audible sounds when a new picture is taken, or when the user changes modes or advances to review the next stored still or motion image file. The digital camera 300 can also include a video output driver and connector (not shown) for directly providing a video output signal to a TV (not shown).

When the user presses the shutter button, either a still image or a motion image sequence is captured using the image sensor 314 in accordance with the capture mode selected by the user. The processor 320 receives digital image data from the ASP & A/D converter circuit 316 via the DRAM buffer memory 318, and performs color interpolation followed by color and tone correction, in order to produce rendered still and motion video image data. When the motion video capture mode is used, the rendered motion image data is then compressed by the processor 320, as will be described later, and stored as a motion video image file on the removable memory card 330. When the still image mode is used, the processor 320 produces a smaller size digital still "thumbnail" image of each rendered still image, and stores both the compressed full resolution (e.g., 1800×1200) image data and the compressed thumbnail image data in the same still image file. The thumbnail images can be produced as described in commonly-assigned U.S. Pat. No. 5,164,831, entitled "Electronic Still Camera Providing Multi-Format Storage Of Full And Reduced Resolution Images" to Kuchta et. al., the disclosure of which is herein incorporated by reference.

The digital motion video and still image files produced by the processor 320 are provided to a memory card interface 324, which stores the files on the removable memory card 330. Removable memory cards 330 are known to those skilled in the art. For example, the removable memory card 330 can conform to the Compact Flash interface standard, such as is described in the *CompactFlash Specification Version* 1.3, published by the CompactFlash Association, Palo Alto, Calif., Aug. 5, 1998. Other types of removable memory cards, including Smart Media cards, PC cards, SD cards, MMC cards, or Memory Stick cards could alternatively be used.

The still images and the thumbnail images stored on the removable memory card 330 can use the so-called "Exif" image format defined in "Digital Still Camera Image File Format (Exif)" version 2.1, July 1998 by the Japan Electronics Industries Development Association (JEIDA), Tokyo, Japan. This format includes an Exif application segment that stores particular image metadata, for example, the date and time the image was captured, the lens f/number and other camera settings, and image captions or comments that can be selected or entered by the camera user. The motion video images can be stored as motion JPEG images on the removable memory card 330 using the well-known QuickTime format developed by Apple Computer Inc.

The first frame of the motion JPEG image is later used as a thumbnail image, to represent the motion video file in an image navigation display. Therefore, the first frame of the motion image sequence is compressed using a higher target bit rate in order to yield a higher quality level for the still image that will be used to represent the motion image sequence. All of the other frames of the motion sequence are compressed using a lower target bit rate, so that they have a lower quality level. Preferably, the target data rate is set by selecting an appropriate quantization table. To provide a higher target bit rate and correspondingly higher quality level, the quantizer table has finely spaced quantization steps. This enables the compressed first frame to more accurately depict the original image data, minimizing visible compression artifacts. To provide a lower target bit rate, a quantization table with more coarsely spaced quantization steps is used. This decreases the quality as a result of compression artifacts, but such a decreased quality level is acceptable since these video images will be only viewed as part of a motion video sequence, and will not normally be viewed as a still image.

As one example, the first frame of the motion JPEG image (640×480 pixels) can be compressed using a target bit rate of 500 Kbytes/sec, which at a frame rate of 10 images/sec is equal to 50 Kbytes per image frame. Subsequent frames can be compressed using a target bit rate of 300 Kbytes/sec, which at a frame rate of 10 images/sec is equal to 30 Kbytes per image frame.

The firmware memory 328 stores the quantization tables used to provide these different target data rates, as well as the quantization table used to compress still images. Therefore, three different quantization tables are stored in the firmware memory 328, including one for the first motion image frame, a second for the other motion image frames, and a third for still image frames.

In some embodiments of the present invention, the user controls 303 of the digital camera 300 include a "quality mode" control (not shown) which enables the user to select from among different quality levels (e.g., two quality modes for "best" and "good"). In such embodiments, there will be a set of three quantization tables for each quality mode stored in the firmware memory 328 (e.g., a total of six quantization tables for a digital camera 300 having "best" and "good" quality modes).

It will be understood that other motion compression methods could be used with the present invention. For example, the well-known MPEG-1, MPEG-2 or MPEG-4 compression algorithms could be used. These compression algorithms use interframe coding, where the differences between blocks of the current image frame and forward-predicted "P" (and in some cases bi-directionally predicted "B") blocks of temporally adjacent frames are compressed. Such algorithms include an initial "I" (Intraframe coded) frame as the first image, and then regularly include an "I" frame after groups of "P" (and in some cases "B") frames. Therefore, in accordance with the present invention, a higher target bit rate (finer quantizer) is used for the first "I" frame of the motion sequence, and a lower target bit rate (coarser quantizer) is used for subsequent "I" frames of the sequence.

Figure 3A:
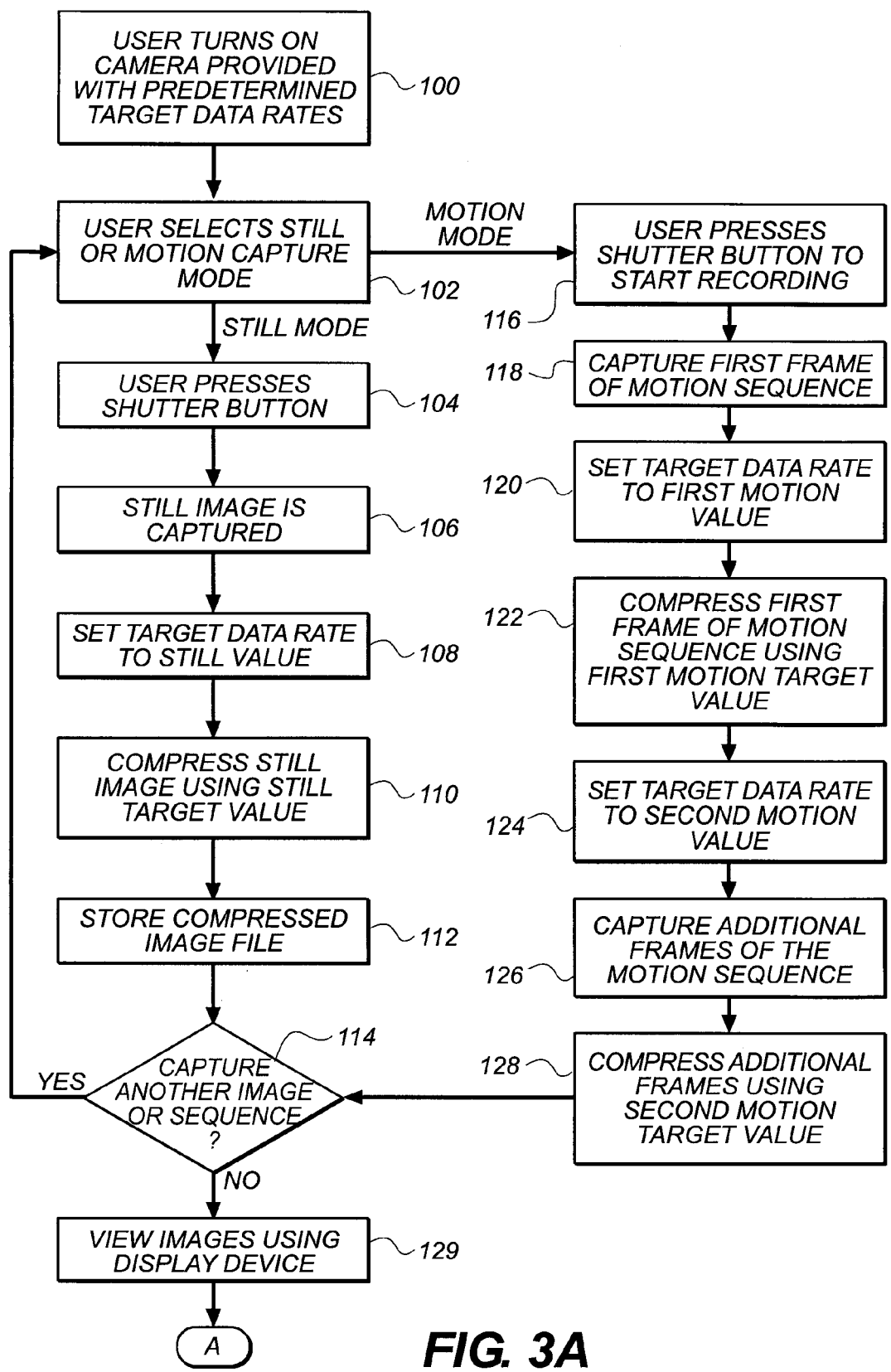
FIGS. 3A-3B, taken together, depict a flow diagram showing a method for providing an improved image navigation display from a compressed video file.
Figure 3B:
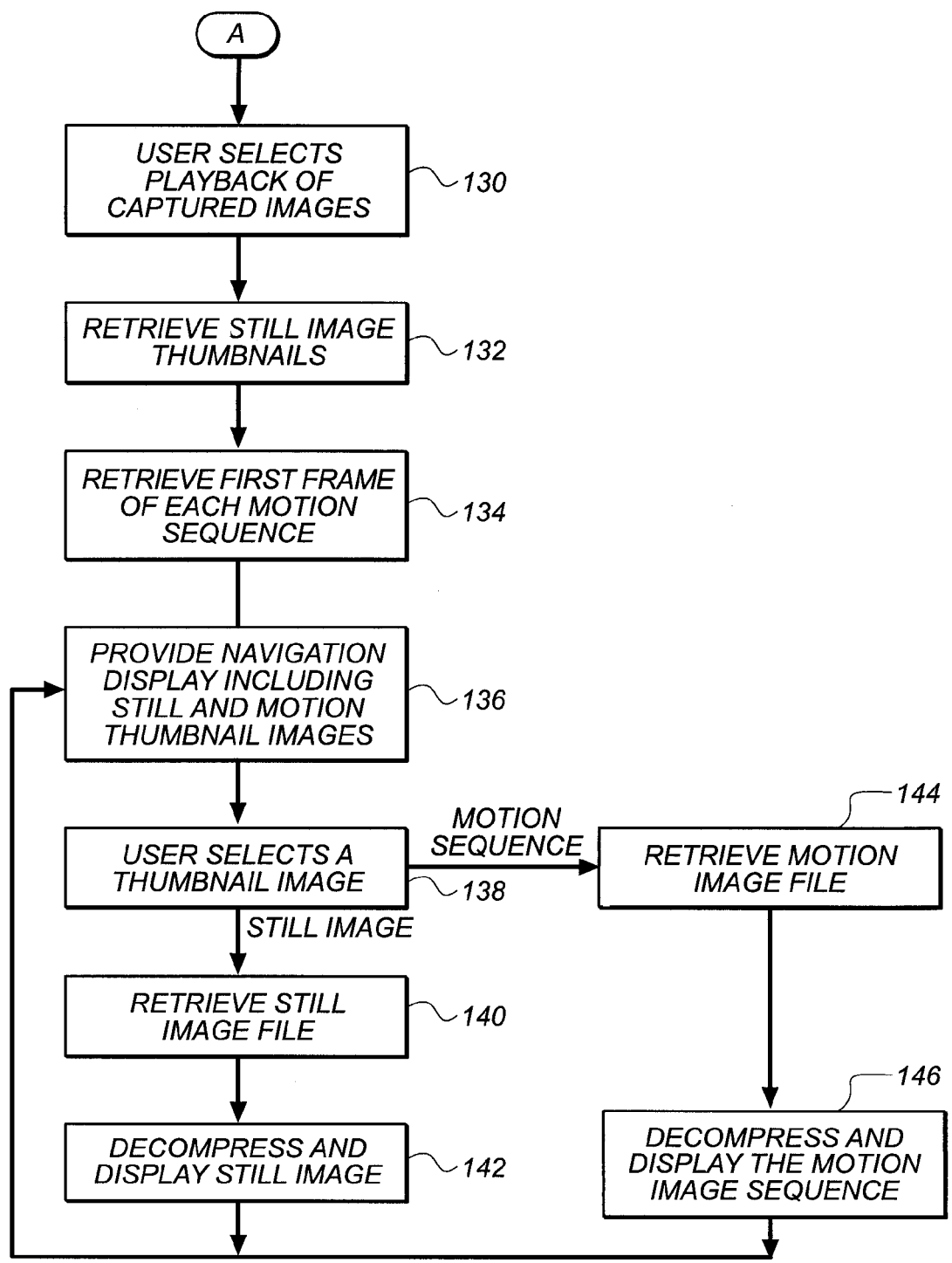

FIGS. 3A and 3B, taken together, depict a flow diagram showing a method for providing an improved image navigation display from a compressed video file, implemented in accordance with the present invention using the system described earlier in relation to FIGS. 1 and 2.

In block 100, the user turns on the digital camera 300, which has been provided with six quantization tables, corresponding to predetermined target data rates for the first and for the subsequent images of a motion image sequence, and for still images, for both "best" and "good" quality levels, as was described earlier with reference to FIG. 2. It should be noted that the use of two quality levels is exemplary and that a different number of quality levels could be used with the number of quantization tables being adjusted accordingly, as previously described.

In block 102, the user selects either the still or motion capture mode, using the mode control provided as part of the user controls 303 shown in FIG. 2. If the user selects the still mode in block 102, when the user presses the shutter button (block 104), a still image in captured (block 106). In block 108, the target data rate for the still image is retrieved from the firmware memory 328. In a preferred embodiment, this is done by retrieving the still image quantization table corresponding to the selected (e.g., "best" or "good") quality level. In block 110, the still image is processed and JPEG compressed using the retrieved quantization table. In block 112, the compressed full resolution image and thumbnail image data are stored in the Exif/JPEG image file.

In block 114, the user decides whether or not to capture another still image, or a motion image sequence. If yes to block 114, in block 102 the user selects (or continues to use the previously selected) a still or motion capture mode to capture another still or motion image sequence.

If in block 102 the user selected the motion mode, the user presses the shutter button to start recording a motion image sequence (in block 116). In block 118, the first frame of the motion sequence is captured. In block 120, the target data rate to be used for compression is set to be the first motion target value. In a preferred embodiment, this is done by retrieving the quantization table for the first motion image frame corresponding to the selected quality level (e.g., "best" or "good"). In block 122, the first frame of the motion image sequence is compressed using the first motion target value, as a result of using the first motion frame quantization table.

In block 124, the target data rate is set to be the second motion target value, so that this value is used for all subsequent frames of the motion image sequence. As a result, the quantization table corresponding to the second motion target value is used. In block 126, additional frames of the motion image sequence are captured, and in block 128, each additional frame is compressed using the second motion image quantization table. It will be understood that blocks 126 and 128 are repeated for each additional frame of the motion image sequence, until the user stops the recording of the sequence, for example, by pressing the shutter button a second time.

Figure 4:
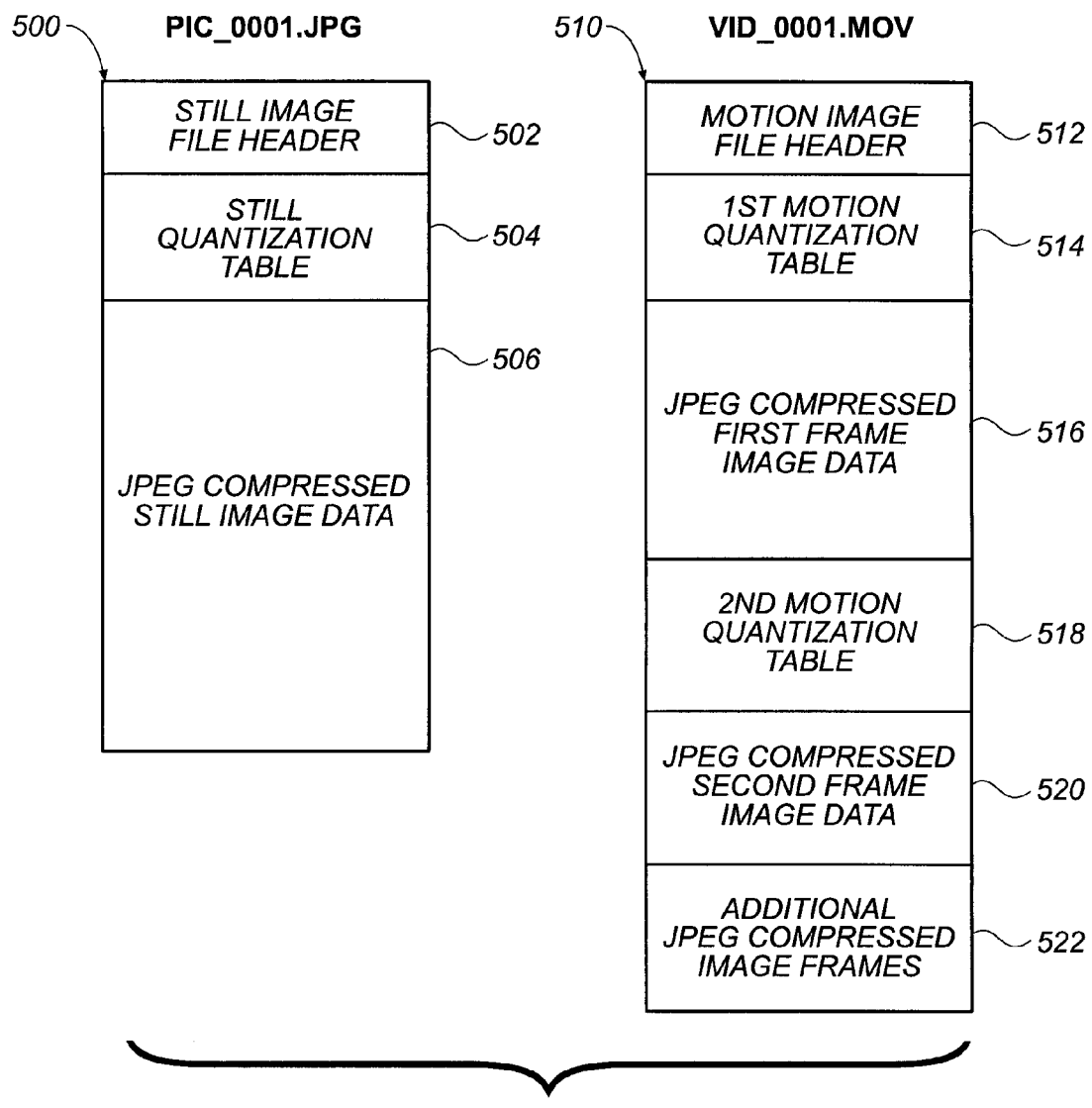
FIG. 4 is a diagram illustrating the arrangement of the motion and still image files provided by the camera of FIG. 2.

FIG. 4 is a diagram illustrating the arrangement of the motion and still image files stored on the removable memory card 330. The Exif/JPEG file 500 (named PIC_0001.JPG) stores a single still image. The image file 500 includes a still image file header 502 which includes a compressed thumbnail image, a still image quantization table 504, and the JPEG compressed still image data 506. The Quicktime movie file 510 (named VID_0001.MOV) includes a motion image file header 512, a $1^{st}$ motion quantization table 514, JPEG compressed first frame image data 516, a $2^{nd}$ motion quantization table 518, motion compressed second frame image data 520, and additional JPEG compressed image frames 522 of the motion image sequence. It will be understood that the number of additional JPEG compressed image frames depends on the length of the motion image segment, and that the same $2^{nd}$ motion quantization table 518 can be repeated as part of each additional JPEG compressed image frame.

In block 114 of FIG. 3A, the user decides whether or not to capture another still image, or a motion image sequence. If no to block 114, the user can view the images using an display device (block 129). The display device can be the color image display 332 of the digital camera 300 (shown in FIG. 2). Alternatively, the display device can be the TV 370 in FIG. 1 or the monitor 387 of the desktop PC 381 in FIG. 1. To display the images on the monitor 387, the images can be transferred from the removable memory card 330 of the digital camera 300 to a memory, such as a hard drive (not shown) of the desktop PC 381 over the interface 383.

In block 130 of FIG. 3B, the user selects to playback the captured images. This selection can be done using the mode control of the digital camera 300, so that the images are displayed on the color image display 332 or the TV 370. Alternatively, if the images are transferred to the desktop PC 381, this can be done using the appropriate PC user controls, such as a mouse (not shown) and/or keyboard (not shown).

In block 132, the processor 320 in the digital camera 300 (or alternatively, the processor (not shown) in the desktop PC 381) retrieves the still image thumbnails from the Exif/JPEG image files (e.g., from the still image file header 502 in FIG. 4). In block 134, the processor 320 in the digital camera 300 (or alternatively, the processor (not shown) in the desktop PC 381) retrieves the first compressed image frame from the motion image files (e.g., the $1^{st}$ motion quantization table 514 and the JPEG compressed $1^{st}$ image frame 516 in FIG. 4).

In block 136, the processor 320 in the digital camera 300 (or alternatively, the processor (not shown) in the desktop PC 381) provides a navigation display including still and motion thumbnail images.

Figure 5:
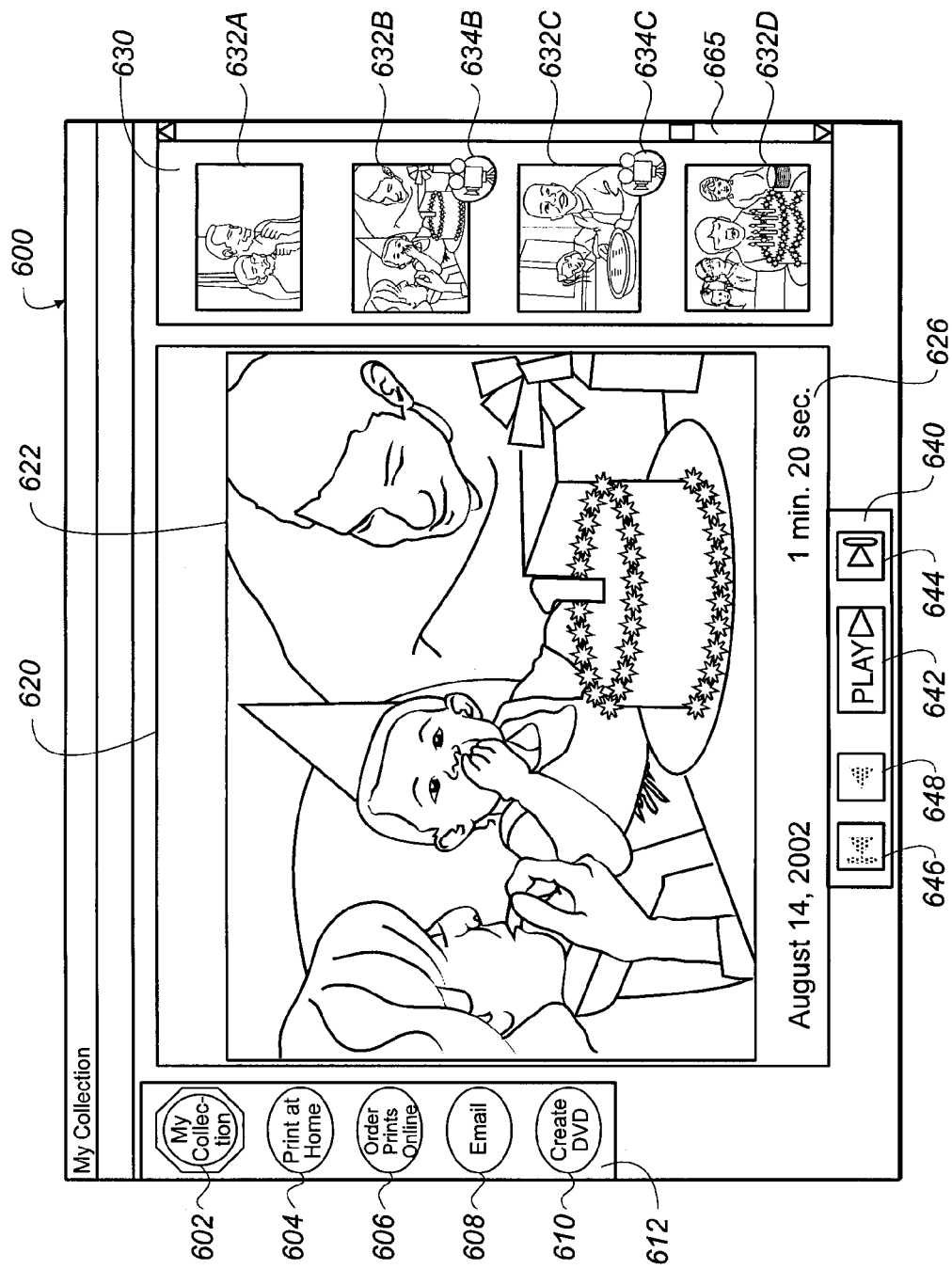
FIG. 5 depicts an image navigation display in accordance with the present invention.

FIG. 5 depicts an exemplary image navigation display 600 in accordance with the present invention. The image navigation display 600 is displayed for the user to view on the PC monitor 387 or the TV monitor 370. Alternatively, a simplified version of the image navigation display 600 could be displayed on the smaller screen of the color image display 332 of the digital camera 300. The image navigation display 600 includes a function control area 612 which displays function icons 602-610, including a "My Collection" icon 602, a "Print at Home" icon 604, an "Order Prints Online" icon 606, an "Email" icon 608, and a "Create DVD" icon 610. In the example shown in FIG. 5, the "My Collection" icon 602 has been previously selected, so that the image navigation display 600 is currently displayed.

The image navigation display 600 includes an area 630 for displaying a plurality of small navigation (e.g., thumbnail) images 632A, 632B, 632C and 632D stored in the image files on the removable memory card 330 of the digital camera 300, or on the hard drive (not shown) of the desktop PC 381. The user can move a scroll bar 665 up or down to display other thumbnail images in the user's collection (e.g., other images stored on the removable memory card 330 of the digital camera 300, or the hard drive (not shown) of the desktop PC 381. Each small navigation image 632A-632D represents either a still image file or a motion image file. Adjacent the small navigation image of each motion image sequence is an icon indicating that the corresponding file is a motion image file. For example, as shown in FIG. 5, icon 634B indicates that the adjacent small navigation image 632B is representative of a motion image sequence.

The image navigation display 600 further includes an image window 620 for displaying a large navigation image 622, which corresponds to a selected one of the small navigation images 632A-632D. Adjacent the large navigation image 622 within the image window 620 is metadata including the date 624 (e.g., Aug. 14, 2002 in the example shown in FIG. 5) that the file was captured by the digital camera 300, and the length 626 (e.g., 1 min. 20 sec. in the example shown in FIG. 5) of the motion image sequence. Below the image window 620 is a playback control area 640 having a plurality of control icons, including a "PLAY" icon 642, a "fast-forward" icon 644, a "reverse" icon 646, and a "fast-reverse" icon 648. The "reverse" icon 646 and the "fast-reverse" icon 648 are not selectable in the image navigation display 600 of FIG. 5 since the image window 620 is currently displaying the first frame of the motion image sequence, so there are no "previous" image frames.

By using a higher target frame rate to produce the first frame of the motion image sequence displayed as a still image in the image window 620, the present invention provides an improved image navigation display 600.

Referring again to FIG. 3B, in block 138 the user selects a thumbnail image using the appropriate user controls 303 on the digital camera 300, or alternatively, using the user controls on the desktop PC 381. If the user has selected a still image, in block 140 the still image data (e.g., JPEG compressed still image data 506 shown in FIG. 4) is retrieved (from the removable memory card 330, or alternatively, from the hard drive (not shown) of the desktop PC 381). In block 142 the JPEG compressed still image data is decompressed and displayed as the large navigation image 622 within the image window 620 in place of the navigation display.

If, in block 138, the user selected a motion image sequence, when the user then selects the "PLAY" icon 642 shown in FIG. 5 (or alternatively, double-clicks on the thumbnail image corresponding to the motion image sequence in area 630 of the image navigation display 600), the motion image file (e.g., file 510 in FIG. 4) is retrieved in block 144. In block 146, the motion image file is then decompressed and displayed in the image window 620 shown in FIG. 5.

The invention has been described with reference to certain preferred embodiments thereof. However, it will be appreciated that variations and modifications can be effected by a person of ordinary skill in the art without departing from the spirit and scope of the invention.

PART LIST 100-146 blocks
300 digital camera
302 flash
303 user controls
304 control processor and timing generator circuit
306 clock driver
308 autofocus and autoexposure detectors
310 zoom and focus motor drives
312 zoom lens
314 image sensor
316 analog signal processing and analog-to-digital converter circuit
318 DRAM buffer memory
320 processor
322 docking interface
324 memory card interface
326 RAM memory
328 firmware memory
330 flash memory card
332 image display
333 microphone
335 audio amp & A/D
337 D/A and audio amp
339 Speaker
344 power supply
346 rechargeable batteries
350 docking unit
350A TV docking unit
350B computer docking unit
360A DVD recorder
360B DVD recorder
370 TV monitor or receiver
372 standard video interface
381 personal computer
383 digital interface
385 color printer
387 display monitor
500 image file
502 still image file header
504 still image quantization table
506 JPEG compressed still image data
510 Quicktime movie file
512 motion image file header
514 $1^{st}$ motion quantization table
516 JPEG compressed first frame image data
518 $2^{nd}$ motion quantization table
520 motion compressed second frame image data
522 additional JPEG compressed image frames
600 image navigation display
602 "My Collection" icon
604 "Print at Home" icon
606 "Order Prints Online" icon
608 "Email" icon
610 "Create DVD" icon
612 function control area
620 image window
622 large navigation image
624 date
626 length
630 area
632A-632D small navigation images 634B icon
634C icon
640 playback control area
642 "PLAY" icon
644 "fast-forward" icon
646 "reverse" icon
648 "fast-reverse" icon
665 scroll bar

What is claimed is:

1. A method for producing a motion video image file from a motion image sequence, comprising the steps of:
   a) providing a first target data rate for a first image frame of the motion image sequence;
   b) compressing the first image frame using intraframe coding at the first target data rate, and storing the compressed first image frame, as a first intracoded frame of a compressed version of the motion image sequence, in a motion video image file;
   c) providing a second target data rate for intraframe coding of one or more subsequent image frames of the motion image sequence, the second target data rate being lower than the first target data rate;
   d) compressing the one or more subsequent image frames of the motion image sequence using intraframe coding at the second target data rate;
   e) storing the compressed one or more subsequent image frames, as one or more subsequent intracoded frames of the compressed version of the motion image sequence, in the motion video image file;
   f) decompressing the compressed first image frame; and
   g) using the decompressed first image frame to provide a still image representative of the motion video image file;
   wherein upon selection of the motion video image file for playback, the compressed first and subsequent image frames are decompressed and utilized to provide playback of the respective first and subsequent image frames of the motion image sequence.

2. The method according to claim 1 wherein the still image is used to represent the motion image sequence in an image navigation display to enable user selection of the corresponding motion video image file.

3. The method according to claim 2 wherein the image navigation display includes a plurality of still images corresponding to a plurality of motion video image files.

4. The method according to claim 3 wherein the image navigation display further includes a plurality of still images corresponding to a plurality of still image files.

5. The method according to claim 1 wherein the first target data rate is provided using a first quantization table and the second target data rate is provided using a second quantization table.

6. The method according to claim 1 further including the step of capturing the motion image sequence.

7. The method according to claim 6 further including the step of capturing a plurality of still images and storing each of the plurality of still images in a still image file.

8. The method according to claim 1 wherein the motion video image file is a motion JPEG file.

9. The method according to claim 1 wherein the motion video image file is an MPEG file.

10. A digital camera for capturing a motion image sequence and producing a motion video image file from the motion image sequence, comprising:
    a) an image sensor for capturing a motion image sequence having a plurality of image frames;
    b) a processor for compressing the motion image sequence, wherein the processor compresses a first image frame of the motion image sequence using intraframe coding at a first target data rate and compresses one or more subsequent image frames of the motion image sequence using intraframe coding at a second target data rate, the second target data rate being lower than the first target data rate; and
    c) a memory for storing the compressed motion image sequence, wherein the compressed first image frame and compressed one or more subsequent image frames are stored as respective intracoded frames in a motion video image file;
    wherein upon selection of the motion video image file for playback, the compressed first and subsequent image frames are decompressed and utilized to provide playback of the respective first and subsequent image frames of the motion image sequence.

11. The digital camera according to claim 10 wherein the digital camera further includes a display, and wherein the processor further decompresses the first image frame of the motion image sequence to provide a still image representative of the motion video image file, and the display displays the still image.

12. The digital camera according to claim 10 wherein the memory is a removable memory card.

13. The digital camera according to claim 10 wherein the first target data rate is provided using a first quantization table and the second target data rate is provided using a second quantization table.

14. The digital camera according to claim 13 wherein the digital camera further includes firmware memory which stores the first and second quantization tables.

15. The digital camera according to claim 14 wherein the digital camera further captures and compresses still images, and the firmware memory stores a third quantization table used to compress the still images.

16. The digital camera according to claim 10 wherein the motion video image file is a motion JPEG file.

17. The digital camera according to claim 10 wherein the motion video image file is an MPEG file.

* * * * *